(12) United States Patent
Etchegoyen

(10) Patent No.: US 8,949,954 B2
(45) Date of Patent: *Feb. 3, 2015

(54) CUSTOMER NOTIFICATION PROGRAM ALERTING CUSTOMER-SPECIFIED NETWORK ADDRESS OF UNAUTHORIZED ACCESS ATTEMPTS TO CUSTOMER ACCOUNT

(71) Applicant: Uniloc Luxembourg, S.A., Luxembourg (LU)

(72) Inventor: Craig S. Etchegoyen, Plano, TX (US)

(73) Assignee: Uniloc Luxembourg, S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,886

(22) Filed: Dec. 7, 2012

(65) Prior Publication Data

US 2013/0167203 A1 Jun. 27, 2013

Related U.S. Application Data

(60) Provisional application No. 61/568,606, filed on Dec. 8, 2011.

(51) Int. Cl.
*H04L 29/06* (2006.01)

(52) U.S. Cl.
CPC ........ *H04L 63/0861* (2013.01); *H04L 63/0876* (2013.01)
USPC .............................................. 726/5; 713/182

(58) Field of Classification Search
CPC ............ G06F 21/00; G06F 2221/2141; H04L 63/0876
USPC .......................................................... 726/4
See application file for complete search history.

(56) References Cited

U.S. PATENT DOCUMENTS

| 4,200,770 A | 4/1980 | Hellman et al. |
| 4,218,582 A | 8/1980 | Hellman et al. |

(Continued)

FOREIGN PATENT DOCUMENTS

| EP | 1 903 518 | 9/2007 |
| GB | 2391965 | 2/2004 |

(Continued)

OTHER PUBLICATIONS

Eisen, Ori, "Catching the Fraudulent Man-in-the-Middle and Man-in-the-Browser," *Network Security*, Apr. 2010, pp. 11-12.

(Continued)

*Primary Examiner* — Hadi Armouche
*Assistant Examiner* — Bryan Wright
(74) *Attorney, Agent, or Firm* — Sean D. Burdick

(57) ABSTRACT

A network security system includes a server configured to receive an access request via a network from a remote computing device, a database storing customer account information accessible by the server, and memory accessible by the server and storing a customer notification program. When executed by the server, the program identifies the remote computing device by a device fingerprint and requesting location, determines whether the device fingerprint matches any authorized device fingerprints stored in the database and sends, responsive to a mismatch between the device fingerprint and the authorized device fingerprints, a notification of the request to a customer-specified address. The notification indicates the request, the identity of the remote computing device, and the requesting location. The program may resolve the request responsive to a reply to the notification from the customer-specified address.

21 Claims, 8 Drawing Sheets

(56) References Cited

U.S. PATENT DOCUMENTS

| | | | |
|---|---|---|---|
| 4,323,921 A | 4/1982 | Guillou | |
| 4,337,483 A | 6/1982 | Guillou | |
| 4,405,829 A | 9/1983 | Rivest et al. | |
| 4,450,535 A | 5/1984 | de Pommery et al. | |
| 4,633,036 A | 12/1986 | Hellman et al. | |
| 4,652,990 A | 3/1987 | Pailen et al. | |
| 4,672,572 A | 6/1987 | Alsberg | |
| 4,747,139 A | 5/1988 | Taafe | |
| 4,868,877 A | 9/1989 | Fischer | |
| 4,977,594 A | 12/1990 | Shear | |
| 5,005,200 A | 4/1991 | Fischer | |
| 5,019,813 A | 5/1991 | Kip et al. | |
| 5,048,085 A | 9/1991 | Abraham et al. | |
| 5,050,213 A | 9/1991 | Shear | |
| 5,123,045 A | 6/1992 | Ostrovsky et al. | |
| 5,144,667 A | 9/1992 | Pogue, Jr. et al. | |
| 5,148,481 A | 9/1992 | Abraham et al. | |
| 5,155,680 A | 10/1992 | Wiedemer | |
| 5,162,638 A | 11/1992 | Diehl et al. | |
| 5,191,611 A | 3/1993 | Lang | |
| 5,204,901 A | 4/1993 | Hershey et al. | |
| 5,231,668 A | 7/1993 | Kravitz | |
| 5,239,648 A | 8/1993 | Nukui | |
| 5,249,178 A | 9/1993 | Kurano et al. | |
| 5,313,637 A | 5/1994 | Rose | |
| 5,349,643 A | 9/1994 | Cox et al. | |
| 5,418,854 A | 5/1995 | Kaufman et al. | |
| 5,606,614 A | 2/1997 | Brady et al. | |
| 6,098,053 A | 8/2000 | Slater | |
| 6,098,106 A | 8/2000 | Philyaw et al. | |
| 6,163,843 A | 12/2000 | Inoue et al. | |
| 6,681,017 B1 | 1/2004 | Matias et al. | |
| 6,880,079 B2 | 4/2005 | Kefford et al. | |
| 6,999,461 B2 | 2/2006 | Li et al. | |
| 7,032,110 B1 | 4/2006 | Su et al. | |
| 7,032,242 B1 | 4/2006 | Grabelsky et al. | |
| 7,310,813 B2 | 12/2007 | Lin et al. | |
| 7,444,508 B2 | 10/2008 | Karjala et al. | |
| 7,506,056 B2 | 3/2009 | Satish et al. | |
| 7,599,303 B2 | 10/2009 | Nadeau et al. | |
| 7,600,039 B2 | 10/2009 | Tang et al. | |
| 7,739,401 B2 | 6/2010 | Goyal | |
| 7,739,402 B2 | 6/2010 | Roese | |
| 7,818,573 B2 | 10/2010 | Martin et al. | |
| 7,852,861 B2 | 12/2010 | Wu et al. | |
| 7,965,843 B1 | 6/2011 | Maino et al. | |
| 8,018,937 B2 | 9/2011 | Epps et al. | |
| 8,370,265 B2 * | 2/2013 | Coulter et al. | 705/67 |
| 2002/0010864 A1 | 1/2002 | Safa | |
| 2002/0099952 A1 | 7/2002 | Lambert et al. | |
| 2002/0112171 A1 | 8/2002 | Ginter et al. | |
| 2002/0178122 A1 * | 11/2002 | Maes | 705/64 |
| 2003/0063750 A1 | 4/2003 | Medvinsky et al. | |
| 2003/0070067 A1 | 4/2003 | Saito | |
| 2003/0131001 A1 | 7/2003 | Matsuo | |
| 2003/0149777 A1 | 8/2003 | Adler | |
| 2003/0182435 A1 | 9/2003 | Redlich et al. | |
| 2003/0190046 A1 | 10/2003 | Kamerman et al. | |
| 2003/0204726 A1 | 10/2003 | Kefford et al. | |
| 2003/0212892 A1 | 11/2003 | Oishi | |
| 2003/0217263 A1 | 11/2003 | Sakai | |
| 2003/0237004 A1 | 12/2003 | Okamura | |
| 2004/0003288 A1 | 1/2004 | Wiseman et al. | |
| 2004/0145773 A1 | 7/2004 | Oakeson et al. | |
| 2004/0254890 A1 * | 12/2004 | Sancho et al. | 705/67 |
| 2005/0033957 A1 | 2/2005 | Enokida | |
| 2005/0169271 A1 | 8/2005 | Janneteau et al. | |
| 2005/0187890 A1 | 8/2005 | Sullivan | |
| 2005/0278542 A1 * | 12/2005 | Pierson et al. | 713/182 |
| 2006/0075134 A1 | 4/2006 | Aalto et al. | |
| 2006/0095454 A1 | 5/2006 | Shankar et al. | |
| 2006/0130135 A1 | 6/2006 | Krstulich et al. | |
| 2006/0253584 A1 | 11/2006 | Dixon et al. | |
| 2006/0271485 A1 | 11/2006 | McKenzie et al. | |
| 2006/0280207 A1 | 12/2006 | Guarini et al. | |
| 2007/0005974 A1 | 1/2007 | Kudou | |
| 2007/0055853 A1 | 3/2007 | Hatasaki et al. | |
| 2007/0079365 A1 | 4/2007 | Ito et al. | |
| 2008/0022103 A1 | 1/2008 | Brown et al. | |
| 2008/0028114 A1 | 1/2008 | Mun | |
| 2008/0040785 A1 | 2/2008 | Shimada | |
| 2008/0049779 A1 | 2/2008 | Hopmann et al. | |
| 2008/0052775 A1 | 2/2008 | Sandhu et al. | |
| 2008/0076572 A1 | 3/2008 | Nguyen et al. | |
| 2008/0082813 A1 | 4/2008 | Chow et al. | |
| 2008/0097924 A1 | 4/2008 | Carper et al. | |
| 2008/0098471 A1 | 4/2008 | Ooi et al. | |
| 2008/0114709 A1 | 5/2008 | Dixon et al. | |
| 2008/0226142 A1 * | 9/2008 | Pennella et al. | 382/124 |
| 2008/0244739 A1 | 10/2008 | Liu et al. | |
| 2008/0282338 A1 | 11/2008 | Beer | |
| 2008/0298595 A1 | 12/2008 | Narayanan et al. | |
| 2008/0311994 A1 | 12/2008 | Amaitis et al. | |
| 2009/0003600 A1 | 1/2009 | Chen et al. | |
| 2009/0006861 A1 | 1/2009 | ven Bemmel | |
| 2009/0016264 A1 | 1/2009 | Hirano et al. | |
| 2009/0099830 A1 | 4/2009 | Gross et al. | |
| 2009/0113088 A1 | 4/2009 | Illowsky et al. | |
| 2009/0158426 A1 | 6/2009 | Yoon et al. | |
| 2010/0146589 A1 | 6/2010 | Safa | |
| 2010/0164720 A1 | 7/2010 | Kore | |
| 2010/0199188 A1 | 8/2010 | Abu-Hakima et al. | |
| 2010/0211795 A1 | 8/2010 | Brown et al. | |
| 2010/0269168 A1 | 10/2010 | Hegli et al. | |
| 2010/0281261 A1 | 11/2010 | Razzell | |
| 2011/0026529 A1 | 2/2011 | Majumdar et al. | |
| 2011/0090896 A1 | 4/2011 | Bradley | |
| 2011/0295988 A1 | 12/2011 | Le Jouan | |

FOREIGN PATENT DOCUMENTS

| | | |
|---|---|---|
| JP | 4 117 548 | 4/1992 |
| JP | 5181734 | 7/1993 |
| WO | WO 01/09756 | 2/2001 |
| WO | WO 2006/102399 | 9/2006 |
| WO | WO 2008/034900 | 3/2008 |
| WO | WO 2008/052310 | 5/2008 |

OTHER PUBLICATIONS

Housley et al., "Internet x.509 Public Key Infrastructure Certificate and CRL Profile," *The Internet Society*, Network Working Group, Sep. 1999, 75 pages. [RFC 2459].

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Zhu, Yunpu, "A New Architecture for Secure Two-Party Mobile Payment Transactions," Submitted to the School of Graduate Studies of the University of Lethbridge, Master of Science, 2010, 240 pages.

Ylonen et al., "The Secure Shell (SSH) Authentication Protocol," *Network Working Group*, Jan. 2006, 17 pages. RFC-4252.

Nesi, et al., "A Protection Processor for MPEG-21 Players," In Proceedings of ICME, 2006, pp. 1357-1360.

* cited by examiner

CUSTOMER NOTIFICATION PROGRAM ALERTING CUSTOMER-SPECIFIED NETWORK ADDRESS OF UNAUTHORIZED ACCESS ATTEMPTS TO CUSTOMER ACCOUNT

This application claims priority pursuant to 35 U.S.C. §119(e) to U.S. provisional application Ser. No. 61/568,606, filed Dec. 8, 2011, which application is specifically incorporated herein, in its entirety, by reference.

BACKGROUND OF THE INVENTION

1. Field of the Invention

The present invention relates generally to schemes for authorizing remote access to secure information through computer network communications. More specifically, the invention relates to a method and system for providing customer notification and authorization of remote requests for access to customer account information.

2. Description of the Related Art

As online banking and electronic financial transactions become more common, the risk of fraudulent transactions rises, and the incidence of external fraud, i.e. fraudulent transactions committed by persons outside the financial institution, becomes more prevalent. The most recent FBI reports on this subject indicate that during the late 1980s and early 1990s, approximately 60 percent of the fraud reported by financial institutions related to bank insider abuse. Since then, external fraud schemes have replaced bank insider abuse as the dominant source of financial institution fraud.

Various security measures for mitigating fraudulent transactions have been implemented to ensure that an authentic user communicates with an authentic financial site. The most effective of these are proactive measures that are implemented at the point of access. Common point-of-access security measures include requirements for verifying user authenticity, such as user entry of a PIN number, user ID, or password, and requirements for verifying site authenticity, such as user recognition of a predetermined image or phrase displayed on the site in response to a user entry. While these measures have been effective, unscrupulous persons continue to develop more creative ways to perpetrate online fraud. A consistent weakness in all of these security measures is that they are only effective so long as a user takes care to maintain her passwords confidential. What is needed is a security scheme that is better insulated from user carelessness.

However, some conventional security measures may be too restrictive. For example, a conventional security measure may indicate that there is fraudulent activity when in fact the user herself is the one requesting access to the customer account information. Such false positives may be extremely inconvenient for the user as the conventional security measure may prevent all access to the user's customer account information, unless the user performs some action such as calling in and speaking to a live attendant or visiting a branch in person. This may be detrimental to the user if she needs to access the customer account information quickly or from afar.

Thus, there is a need for an improved method and system for authorizing remote access to customer account information.

SUMMARY OF THE INVENTION

The invention disclosed herein addresses the problems reviewed above. Generally, the invention fundamentally changes the status quo approach to fraud detection by directly involving the party best equipped to determine fraud, i.e. the account holder, in the fraud determination process. The novelty of incorporating advances in device fingerprinting technology provides the account management entity with a high level of assurance needed when enlisting information from a remote account holder.

An exemplary embodiment of the invention may be realized as a system for authorizing a request for remote access to customer account information. The system generally includes a server configured to receive the request via a network from a remote computing device, a database storing the customer account information accessible by the server, and memory accessible by the server. The memory stores a customer notification program which, when executed by the server, performs steps for (a) identifying, responsive to the server receiving the request, the remote computing device by a device fingerprint and by a requesting location, (b) determining whether the device fingerprint matches any of a number of device fingerprints authorized to access the customer account information, and (c) sending, responsive to determining a mismatch between the device fingerprint and each of the previously authorized device fingerprints, a notification of the request to a customer-specified address, the notification indicating (i) the request, (ii) identity of the remote computing device, and (iii) the requesting location.

Additional embodiments of the invention withhold access to the customer account information until an approval is received from an authorized device. For example, the exemplary method may include a resolving step wherein the customer notification program when executed resolves the request responsive to a reply to the notification. Or the exemplary method may include a storing step wherein the customer notification program when executed stores the device fingerprint and associating the device fingerprint with the customer account information. Or the exemplary embodiment may include an interrogation step wherein the notification further interrogates for an answer approving or disapproving the request, and wherein the resolving step further comprises approving or disapproving the request according to the answer.

More elaborate embodiments of the invention base the decision whether to approve or disapprove the request for remote access on whether the requesting device is determined to be a mobile device or a non-mobile device. In one example, the determining step of the customer notification program further determines, based on the device fingerprint of the requesting remote computing device, whether the remote computing device is a non-mobile computing device, and determines whether the requesting location is an abnormal location. If the remote computing device is a non-mobile computing device and if the requesting location is an abnormal location, the sending step is bypassed and the request is disapproved. In another example, the determining step of the customer notification program further determines, based on the device fingerprint of the requesting remote computing device, whether the remote computing device is a mobile device, determines whether the requesting location is a preauthorized temporary location specified in the customer account information, and determining whether timing of the request falls within time limits specified for the temporary location. If the remote computing device is a mobile device, if the requesting location matches the preauthorized temporary location, and if the timing of the request falls within the specified time limits, the sending step is bypassed and the request is approved.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

The present invention relates to a method and system for authorizing remote access to customer account information.

Figure 1:
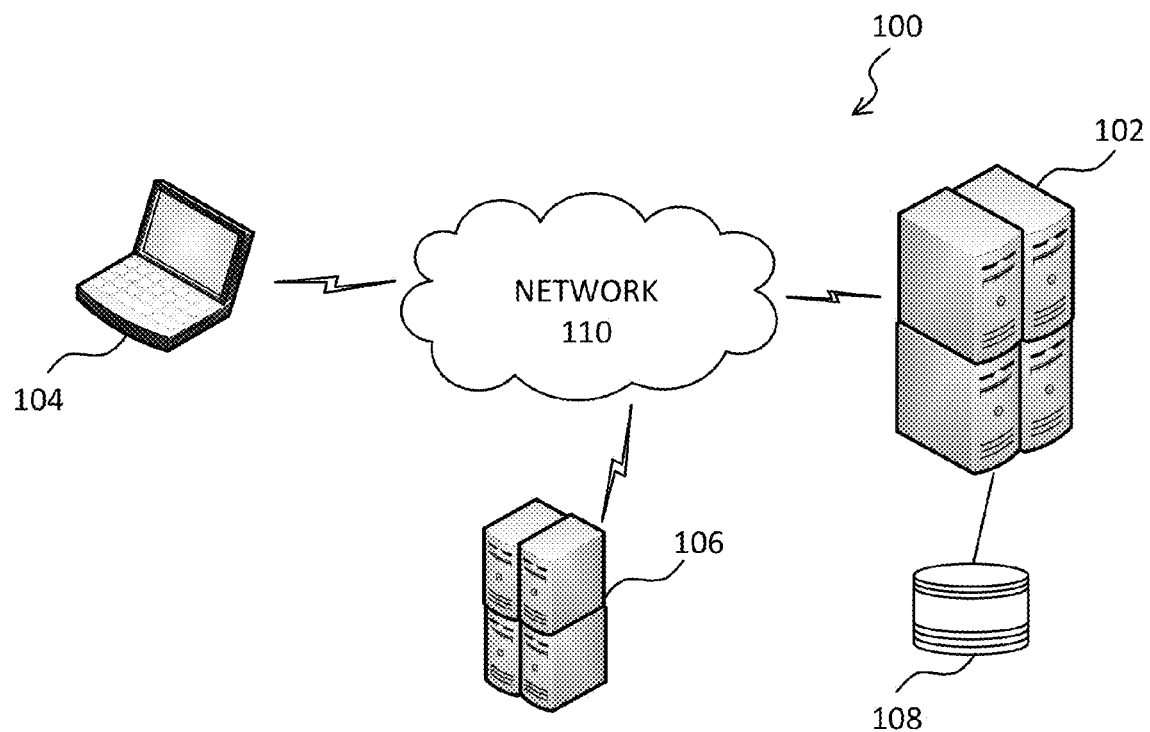
FIG. 1 is a diagram showing a server, a remote computing device, and a customer-specified system, that cooperate to allow an individual to control third-party access to customer account information about that individual in accordance with one embodiment of the present invention.

As seen in FIG. 1, a system 100 for authorizing a request for remote access to customer account information can include, for example, a server 102, a remote computing device 104, and a customer-specified system 106 located at a customer-specified address. The server 102, the remote computing device 104, and the customer-specified system 106 can be connected to a network 110. The network 110 can be, for example, the Internet, telephone network, wide area network, local area network, and/or any combination thereof.

As seen in FIG. 1, the server 102 can be connected to a database 108. The database 108 can store, for example, customer account information, authorized device fingerprints, and/or unauthorized device fingerprints which are accessible by the server 102. The server 102 can be seen in more detail in FIG. 2.

Figure 2:
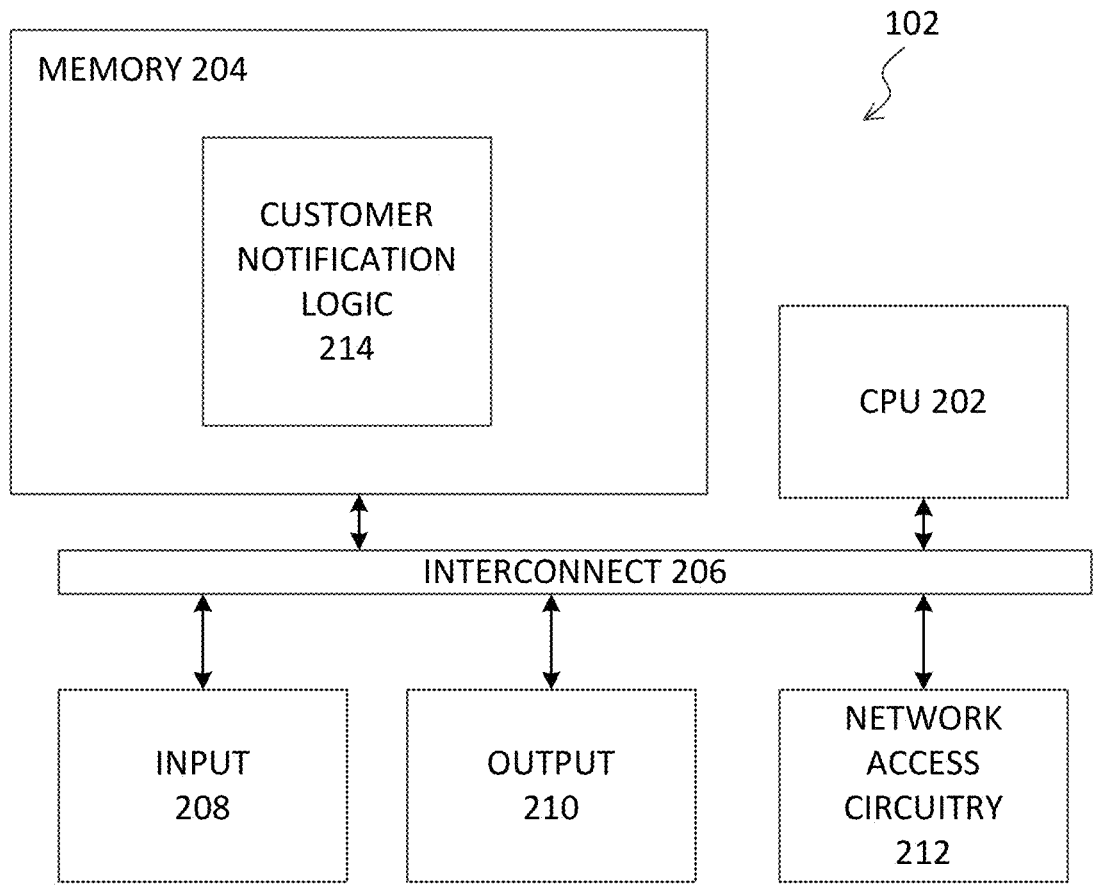
FIG. 2 is a block diagram showing the server according to an embodiment of the present invention.

As seen in FIG. 2, the server 102 can include, for example one or more microprocessors, which are collectively shown as CPU 202. The server 102 also includes, for example, a memory 204, an interconnect 206, an input 208, an output 210, and/or a network access circuitry 212. The CPU 202 can retrieve data and/or instructions from the memory 204 and execute the retrieved instructions. The memory 204 can include generally any computer-readable medium including, for example, persistent memory such as magnetic and/or optical disks, ROM, and PROM and volatile memory such as RAM.

The CPU 202 and the memory 204 are connected to one another through the interconnect 206, which is a bus in this illustrative embodiment. The interconnect 206 connects the CPU 202 and the memory 204 to the input devices 208, the output devices 210, and the network access circuitry 212. The input devices 208 can include, for example, a keyboard, a keypad, a touch-sensitive screen, a mouse, a microphone, and/or one or more cameras. The output devices 210 can include, for example, a display—such as a liquid crystal display (LCD)—and/or one or more loudspeakers. The network access circuitry 212 sends and receives data through computer networks such the network 110 (FIG. 1).

A number of components of the server 102 are stored in the memory 204. In particular, a customer notification logic 214 is part of one or more computer processes executed within the CPU 202 from the memory 204 in this illustrative embodiment, but can also be implemented using digital logic circuitry. As used herein, "logic" refers to (i) logic implemented as computer instructions and/or data within one or more computer processes and/or (ii) logic implemented in electronic circuitry.

In an embodiment, the customer notification logic 214 is executable software stored within the memory 204. For example, when the server 102 receives a request for remote access to a customer account information from the remote computing device 104, the server 102 executes the customer notification logic to determine whether to transmit the customer account information to the remote computing device 104.

When the customer notification logic 214 is executed, the server 102 identifies, responsive to the server 102 receiving the request, the remote computing device 104 by a device fingerprint and by a requesting location. In an embodiment, the server 102 can also interrogate the remote computing device 104 for user-configurable and non-user configurable parameters, and generating a device fingerprint from a combination of the user-configurable and non-user-configurable device parameters. Digital fingerprints, and generation thereof including user-configurable parameters and non-user-configurable parameters, will be described in more detail below. Briefly, a digital fingerprint comprises binary data that identifies a remote computing device 104 by deriving a unique data string from multiple portions of indicia stored in memory locations within the device, where such indicia can include, for example, data representing a manufacture name, a model name, or a device type.

The server 102 also determines whether the device fingerprint matches any of a number of device fingerprints authorized to access the customer account information. That is, the server 102 determines whether the device fingerprint of the remote computing device 104 matches any number of device fingerprints authorized to access the customer account information. In an embodiment, the device fingerprints authorized to access the customer account information can be stored in the memory 204 and/or the database 108. The device fingerprints authorized to access the customer account information can be, for example, all device fingerprints having accessed the customer account information via the network 110 within a predetermined time period prior to the request.

The server 102 can also send, responsive to determining a mismatch between the device fingerprint and each of the previously authorized device fingerprints, a notification of the request for customer account information to a customer-specified address. The customer-specified address can be, for example, a telephone number or an e-mail address. In an embodiment, the customer-specified address can include multiple addresses. For example, the customer-specified address can include both the telephone number and the e-mail address. The notification can include, for example, the request for customer account information, the identity of the remote computing device 104, and the requesting location of the remote computing device 104. In an embodiment, the notification can also interrogate for an answer approving or disapproving the request. In an embodiment, the notification can include a voice message, a text message, or an e-mail, or any combination of these.

The server 102 can receive a reply to the notification from the customer-specified address, and can resolve the request for customer account information responsive to the reply. For example, the server 102 can approve or disapprove the request according to an answer to the notification. The server 102 can also store the device fingerprint and associate the device fingerprint with the customer account information. When the server 102 receives a reply approving the request, the server 102 can store the device fingerprint of the remote computing device 104 as an authorized device fingerprint. When the server 102 receives a reply disapproving the request, the server 102 can store the device fingerprint of the remote computing device 104 as an unauthorized device fingerprint.

Optionally, the server 102 can also receive a device fingerprint 516 corresponding to the customer-specified system 106 from the customer-specified address along with the reply to the notification. The server 102 can determine whether the reply to the notification is a valid or invalid reply based on the device fingerprint 516 of the customer-specified system 106. For example, the server 102 can determine whether the device fingerprint 516 of the customer-specified system 106 matches any of a number of authorized device fingerprints, and/or any number of unauthorized device fingerprints, prior to approving or disapproving the request based on the reply from the customer-specified system 106. If the device fingerprint 516 of the customer-specified system 106 matches an authorized device fingerprint, then the server 102 can treat the reply to the notification as being a valid reply. Otherwise, the server 102 could disregard the reply to the notification as being an invalid reply if the device fingerprint 516 of the customer-specified system 106 does not match an authorized device fingerprint, or if the device fingerprint 516 of the customer-specified system 106 matches an unauthorized device fingerprint.

In modern computing vernacular, the device fingerprint 516 of the customer-specified system 106 may be thought of as an "administrator" fingerprint, to distinguish it from a device fingerprint 316 of a requesting device 104. Administrator fingerprints are used to approve access requests from other devices. There may be one or more administrator fingerprints associated with a customer account, so that a customer may transmit a legitimate authorization from any number of customer-specified devices that have been registered with server 102. In one embodiment, administrator fingerprints may be stored by server 102 separately from authorized device fingerprints that are not administrator fingerprints. In another embodiment, administrator fingerprints are encoded in such as way to distinguish them from non-administrator fingerprints that are associated with the same customer account. An administrator fingerprint is an authorized device fingerprint having a higher security level than an authorized device fingerprint that can only access a customer account. An authorized device fingerprint that can only access a customer account has a higher security level than an unauthorized device fingerprint.

In one embodiment, if the server 102 determines that the device fingerprint of the remote computing device 104 matches any of a number of unauthorized device fingerprints corresponding to a remote computing device previously disapproved from accessing the customer account information, the server 102 can bypass sending a notification of the request to the customer-specified address. Instead, the server 102 can disapprove the request for remote access to customer account information from the remote computing device 104 when the device fingerprint of the remote computing device 104 matches any of a number of unauthorized device fingerprints.

In another embodiment, the server 102 can determine whether the remote computing device 104 is a non-mobile computing device and whether the requesting location of the remote computing device 104 is an abnormal location. An abnormal location could be, for example, an abnormal geographic region, or an abnormal IP address. An abnormal geographic region could be a location where the customer has not authorized access or which is outside the user's normal travel area. An abnormal IP address could be an IP address which would not normally be assigned to the customer's computer system. When the remote computing device 104 is a non-mobile computing device and the requesting location is an abnormal location, the server 102 can bypass sending a notification of the request to the customer-specified address. Instead, the server 102 can disapprove the request for remote access to customer account information from the remote computing device 104 when the remote computing device 104 is a non-mobile computing device and the requesting location is an abnormal location.

In yet another embodiment, the customer account information can also be associated with a preauthorized temporary location and certain time limits. The server 102 determines whether the remote computing device 104 is a mobile device based on the device fingerprint of the remote computing device 104. The server 102 can determine whether the requesting location is a preauthorized temporary location specified in the customer account information. The server 102 can also determine whether the timing of the request falls within time limits specified for the temporary location. If the remote computing device 104 is a mobile device, if the requesting location matches the preauthorized temporary location, and if the timing of the request falls within the specified time limits, the server 102 can bypass sending a notification of the request to the customer-specified address. Instead, the server 102 can approve the request.

Figure 3:
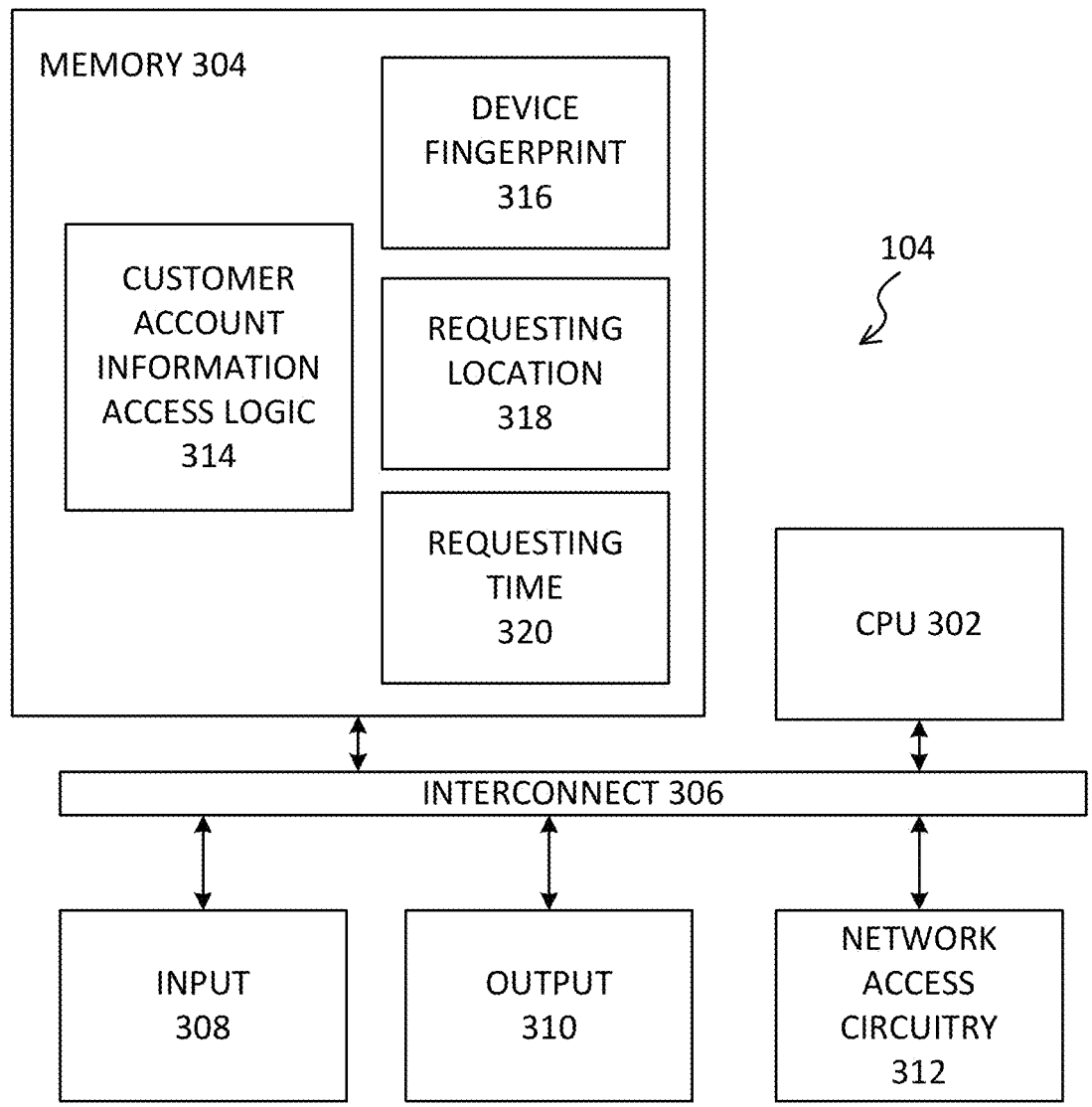
FIG. 3 is a block diagram showing the remote computing device according to an embodiment of the present invention.

As seen in FIG. 3, the remote computing device 104 can include, for example one or more microprocessors, which are collectively shown as CPU 302. The remote computing device 104 also includes, for example, a memory 304, an interconnect 306, an input 308, an output 310, and/or a network access circuitry 312. The CPU 302 can retrieve data and/or instructions from the memory 304 and execute the retrieved instructions. The memory 304 can include generally any computer-readable medium including, for example, persistent memory such as magnetic and/or optical disks, ROM, and PROM and volatile memory such as RAM.

The CPU 302 and the memory 304 are connected to one another through an interconnect 306, which is a bus in this illustrative embodiment. The interconnect 306 connects the CPU 302 and the memory 304 to the input devices 308, the output devices 310, and the network access circuitry 312. The input devices 308 can include, for example, a keyboard, a keypad, a touch-sensitive screen, a mouse, a microphone, and/or one or more cameras. The output devices 310 can include, for example, a display—such as a liquid crystal display (LCD)—and/or one or more loudspeakers. The network access circuitry 312 sends and receives data through computer networks such the network 110 (FIG. 1).

A number of components of the remote computing device 104 are stored in the memory 304. In particular, a customer account information access logic 314 is part of one or more computer processes executed within the CPU 302 from the memory 304 in this illustrative embodiment, but can also be implemented using digital logic circuitry.

In an embodiment, the customer account information access logic 314 is executable software stored within the memory 304. For example, the customer information access logic 314 transmits a request for remote access to a customer account information to the server 102.

When the customer information access logic 314 is executed, the remote computing device 104 generates a device fingerprint 316, and a requesting location 318. The remote computing device 104 can include one or more such information in the request for remote access to the customer account information transmitted to the server 102. Optionally the remote computing device 104 can generate a requesting time 320 which can also be transmitted in the request for remote access to the customer account information to the server 102. The customer account information can include, for example, financial information, medical histories, criminal/court records, driving records, group memberships, and/or any other type of information which may be associated with the customer. In an embodiment, the request can involve a monetary transaction.

Device fingerprints and generation thereof are known and are described, e.g., in U.S. Pat. No. 5,490,216 (sometimes referred to herein as the '216 Patent), and in related U.S. Patent Application Publications 2007/0143073, 2007/0126550, 2011/0093920, and 2011/0093701 (the "related applications"), the descriptions of which are fully incorporated herein by reference. The following description of device fingerprint 316 applies equally to device fingerprint 516.

In general, the device fingerprint 316 comprises a bit string or bit array that includes or is derived from user-configurable and non-user-configurable data specific to the remote computing device 104. Non-user-configurable data includes data such as hardware component model numbers, serial numbers, and version numbers, and hardware component parameters such as processor speed, voltage, current, signaling, and clock specifications. User-configurable data includes data such as registry entries, application usage data, file list information, and MAC address. In an embodiment, the device fingerprint 316 can also include, for example, manufacture name, model name, and/or device type of the remote computing device 104.

Generation of the device fingerprint 316 includes a combination of operations on the data specific to the remote computing device 104, which may include processing using a combination of sampling, concatenating, appending (for example, with a nonce value or a random number), obfuscating, hashing, encryption, and/or randomization algorithms to achieve a desired degree of uniqueness. For example, the desired degree of uniqueness may be set to a practical level such as 99.999999% or higher, to achieve a probability of less than 1 in 100,000,000 that any two remote computing devices will generate identical fingerprints. In an embodiment, the desired degree of uniqueness may be such that the device fingerprint 316 generated is unlike any other device fingerprint generatable responsive to a request to the server from another remote computing device.

In one embodiment, the device fingerprint 316 may be stored in volatile memory and erased after transmission of the request for remote access to the customer account information to the server 102. In another embodiment, the device fingerprint 316 may be stored in persistent memory and written over each time a new fingerprint is generated by the customer account information access logic 314. In another embodiment, the device fingerprint 316 may be omitted from the remote computing device 104 and the device fingerprint 316 may be stored in persistent memory (e.g. ROM).

In yet another embodiment, the remote computing device 104 can be interrogated by the server 102 in order for its device fingerprint to be generated and accessed by the server 102. In such a case, the remote computing device 104, or the server 102 can generate the device fingerprint 316.

In one embodiment, the requesting location 318 can include a geographic location of the remote computing device 104. Such geographic location information can comprise, for example, an internet protocol (IP) address, a country, a state, a city, a zip code, and/or GPS coordinates. The requesting time 320 indicates the time of the request. In one embodiment, the requesting time 320 includes the local time of the remote computing device 104 when the request is made to the server 102. In another embodiment, the requesting time 320 includes the Greenwich Mean Time when the request is made to the server 102.

Figure 4:
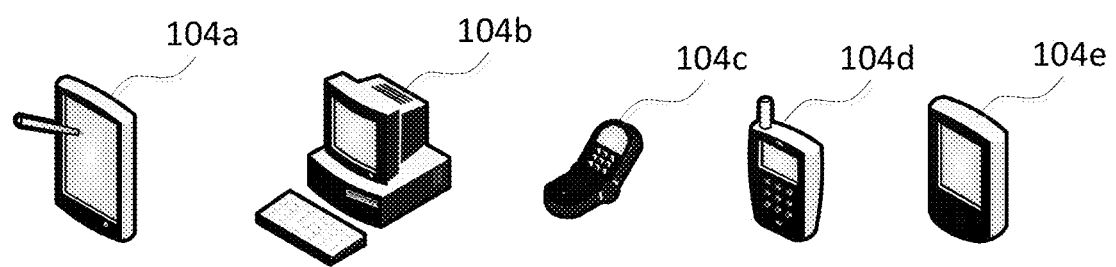
FIG. 4 depicts various remote computing devices according to an embodiment of the present invention.

The remote computing device 104 can be, for example, a variety of electronic devices. For example, in FIG. 4, a remote computing device 104a is a tablet, remote computing device 104b is a computer, a remote computing device 104c is a mobile phone, a remote computing device 104d is a smart phone, and a remote computing device 104e is a personal device assistant ("PDA"). As can be appreciated, the remote computing device 104 is not limited to the remote computing devices 104a-104e depicted in FIG. 4, but can include any other electronic device capable of requesting remote access to the customer account information.

Figure 5:
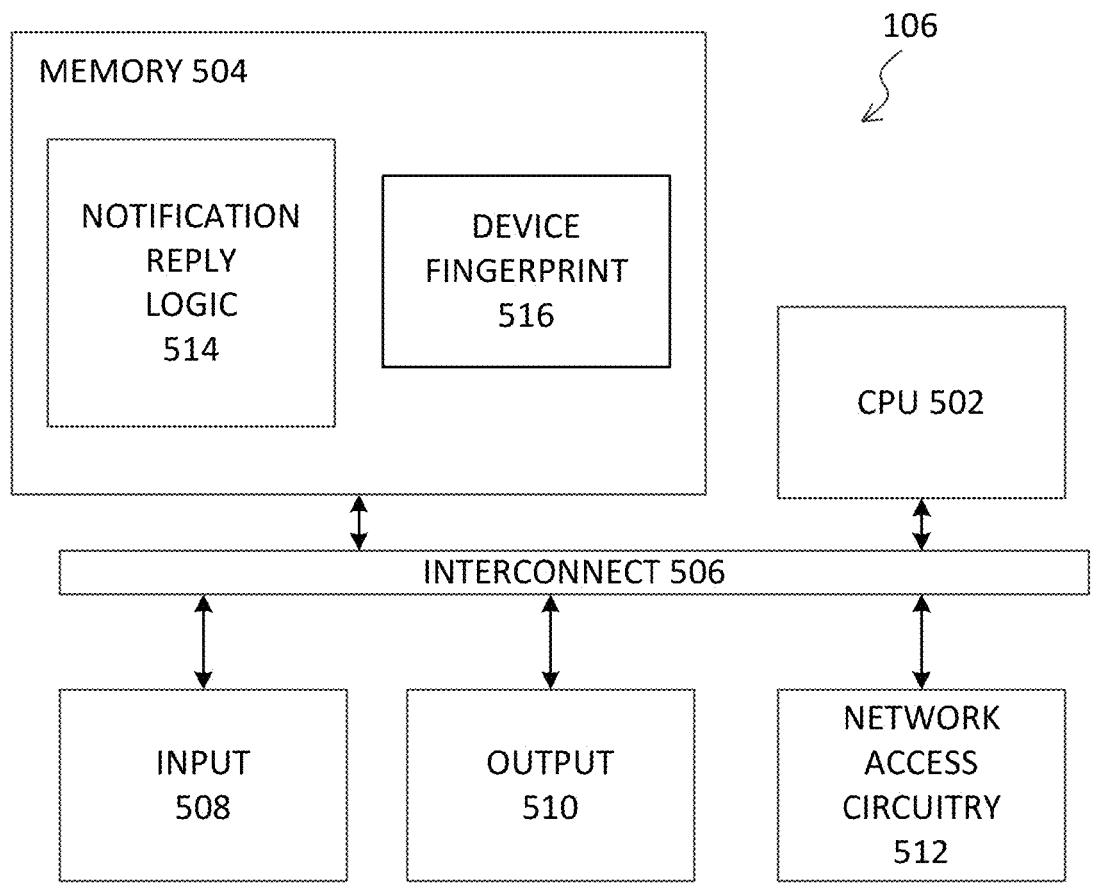
FIG. 5 is a block diagram showing the customer-specified system according to an embodiment of the present invention.

Referring back to FIG. 1, the customer-specified system 106 is a system located at or associated with the customer-specified address. As seen in FIG. 5, the customer-specified system 106 can include, for example one or more microprocessors, which are collectively shown as CPU 502. The customer-specified system 106 also includes, for example, a memory 504, an interconnect 506, an input 508, an output 510, and/or a network access circuitry 512. The CPU 502 can retrieve data and/or instructions from the memory 504 and execute the retrieved instructions. The memory 504 can include generally any computer-readable medium including, for example, persistent memory such as magnetic and/or optical disks, ROM, and PROM and volatile memory such as RAM.

The CPU 502 and the memory 504 are connected to one another through an interconnect 506, which is a bus in this illustrative embodiment. The interconnect 506 connects the CPU 502 and the memory 504 to the input devices 508, the output devices 510, and the network access circuitry 512. The input devices 508 can include, for example, a keyboard, a keypad, a touch-sensitive screen, a mouse, a microphone, and/or one or more cameras. The output devices 510 can include, for example, a display—such as a liquid crystal display (LCD)—and/or one or more loudspeakers. The network access circuitry 512 sends and receives data through computer networks such the network 110 (FIG. 1).

A number of components of the customer-specified system 106 are stored in the memory 504. In particular, a notification reply logic 514 is part of one or more computer processes executed within CPU 502 from memory 504 in this illustrative embodiment, but can also be implemented using digital logic circuitry.

In an embodiment, the notification reply logic 514 is executable software stored within the memory 504. For example, the notification reply logic 514 interacts with the notification of the request for remote access to the customer account information from the server 102 in order to produce a reply to the notification to send to the server 102.

When the notification reply logic 514 is executed, it is responsive to the notification of the request for remote access to the customer account information. In an embodiment, the notification reply logic 514 can interact with the notification to produce a reply to the notification in the form of an approval or disapproval to the server 102. That is, the notification reply logic can approve or disapprove the request for remote access to the customer account information.

In one embodiment, the notification reply logic 514 can utilize the notification to interrogate for an answer approving or disapproving the request for remote access to the customer account information. This interrogation can include, for example, displaying selectable answers on the output 510. In such a case, the output 510 can be, for example, a user interface such as a display screen. In an embodiment, the notification reply logic 514 can perform the interrogation without utilizing the notification. In another embodiment, the notification reply logic 514 can be executed before or after receipt of the notification by the customer-specified system 106.

In an embodiment, the notification reply logic 514 can also generate a device fingerprint 516 for the customer-selected system. The device fingerprint 516 could be transmitted in the reply to the server 102 and used by the server to authenticate the reply.

Figure 6:
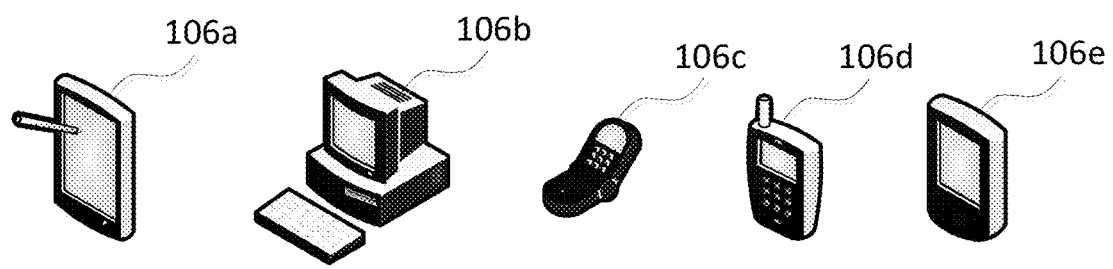
FIG. 6 depicts various customer-specified systems according to an embodiment of the present invention.

The customer-specified system 106 can be, for example, a variety of electronic devices. For example, in FIG. 6, a customer-specified system 106a is a tablet, a customer-specified system 106b is a computer, a customer-specified system 106c is a mobile phone, a customer-specified system 106e is a smart phone, and a customer-specified system 106e is a PDA. As can be appreciated, the customer-specified system 106 is not limited to the customer-specified systems 106a-106e depicted in FIG. 6, but can include any other electronic device located at the customer-specified address.

In an embodiment, the customer-specified system can include multiple electronic devices. For example, when the customer-specified address is a telephone number, the customer-specified system can include a mobile phone and a computer. In addition, more than one customer-specified system can receive the notification, such as when multiple customer-specified addresses are used.

Figure 7:
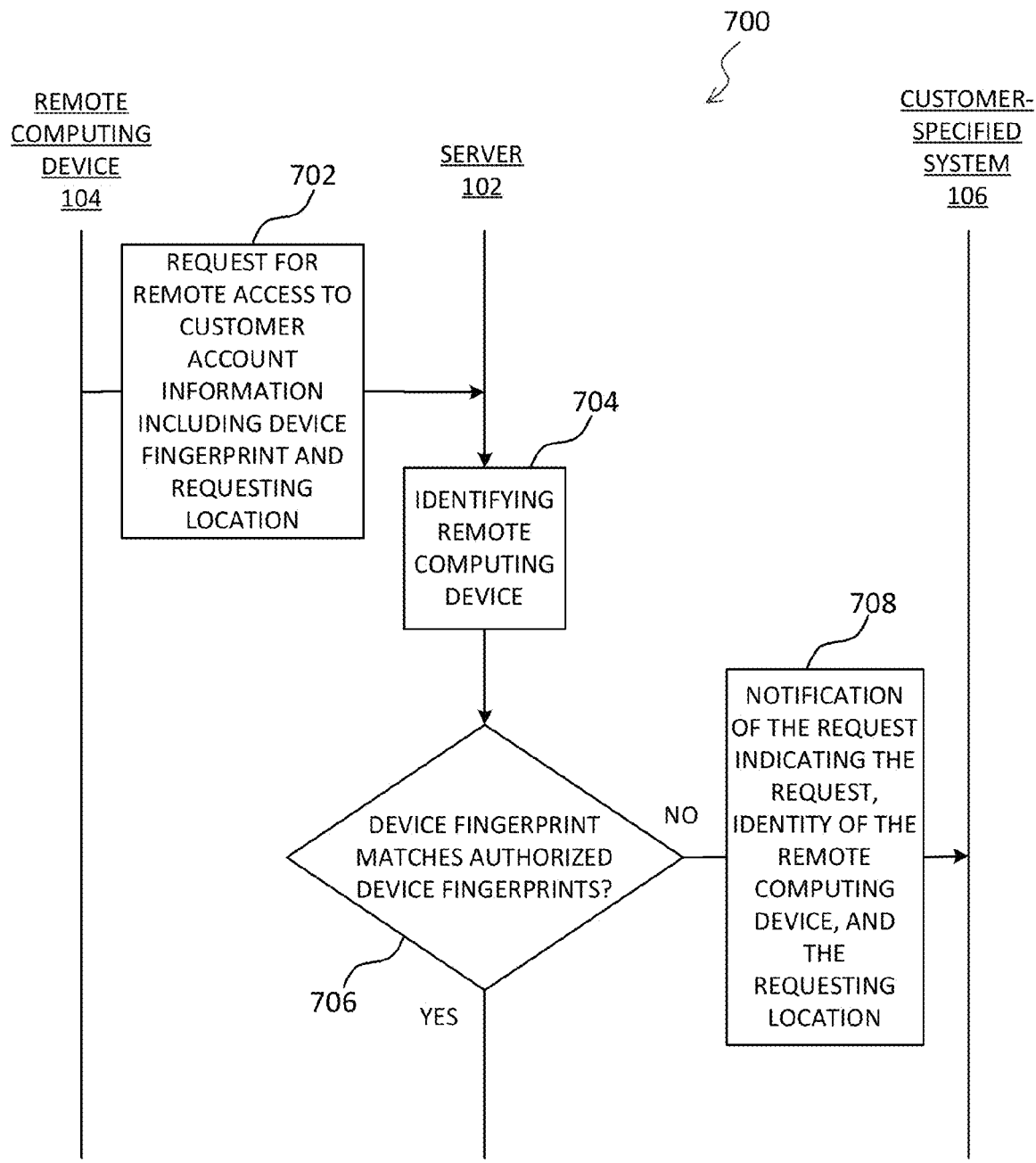
FIG. 7 is a transaction flow diagram illustrating the remote computing device requesting remote access to the customer account information through the server according to an embodiment of the present invention.

In an embodiment, a transaction flow diagram 700 as shown in FIG. 7 illustrates the manner in which the remote computing device 104 requests remote access to customer account information through the server 102 in accordance with the present invention. To facilitate appreciation and understanding of the invention, transaction flow diagram 700 is described in the context of an illustrative example of a customer or a hacker requesting remote access to the bank account information. Of course, there are other types of customer account information that an individual would consider sensitive and would want control over its access. Other examples include medical histories, criminal/court records, driving records, and group membership data.

In step 702, the remote computing device 104 transmits a request for remote access to customer account information. The request can also include a device fingerprint of the remote computing device 104, and a requesting location of the remote computing device 104. For example, a person can request remote access to the bank account information from a laptop in a different state. Such a laptop can be an authorized laptop or an unknown laptop.

The authorized laptop can be a system in which the customer with authority to access the bank account information has approved for use in obtaining access to the bank account information. The authorized laptop's device fingerprint may be stored as an authorized device fingerprint. The unknown laptop can be a system that the customer with authority to access the bank account information has not approved for use in obtaining access to the bank account information. The unknown laptop's device fingerprint is not indicated as an authorized device fingerprint and in some situations may be stored as an unauthorized device fingerprint.

In step 704, the server 102 identifies the remote computing device 104. For example, the server 102 identifies the remote computing device 104 using the device fingerprint and the requesting location of the remote computing device 104. If the requesting device 104 is not equipped to generate a device fingerprint, the server 102 in step 704 may transmit an application program or plug-in to device 104 that contains a fingerprint-generating routine that when executed, reliably generates a digital fingerprint that uniquely identifies device 104. Such as application may further execute steps necessary to transmit the newly generated fingerprint 316 to the server 102. Thus, the server 102 can identify the authorized laptop or the unknown laptop.

In step 706, the server 102 determines whether the device fingerprint of the remote computing device 104 matches an authorized device fingerprint. For example, the server 102 can compare the device fingerprint of the remote computing device 104 with a list of authorized device fingerprints stored in the memory 204 (FIG. 2) or the database 108 (FIG. 1) to determine if there is a match. Thus, the server 102 can compare the device fingerprint of the authorized laptop with the list of authorized device fingerprints or the unknown laptop with the list of authorized device fingerprints.

If the device fingerprint does not match an authorized device fingerprint in step 706, the server 102 proceeds to step 708. For example, in the case where the person is using the unknown laptop to request remote access to the bank account information, the device fingerprint of the unknown laptop utilized will not match an authorized device fingerprint.

In step 708, the server 102 transmits a notification of the request indicating the request, identity of the remote computing device 104, and the requesting location to the customer-specified system 106 located at the customer-specified address. For example, the customer could indicate that he wishes to receive the notification at the customer's e-mail address. In such a case, the server 102 will transmit the notification to the customer's e-mail address where the customer can access the notification using his smart phone or computer or other customer-specified system. This allows the customer to determine whether to grant or deny access to the bank account information by the unknown laptop. Optionally, in some situations, such as when the unknown laptop has an unauthorized device fingerprint, then the server 102 can disapprove the request without sending the request.

However, if the device fingerprint does match an authorized device fingerprint in Step 706, the server 102 can optionally approve the request for remote access to the customer account information without transmitting the notification. For example, in the case where the person is using the authorized laptop, the server 102 can optionally approve the request for remote access to the bank account information without transmitting the notification.

Figure 8:
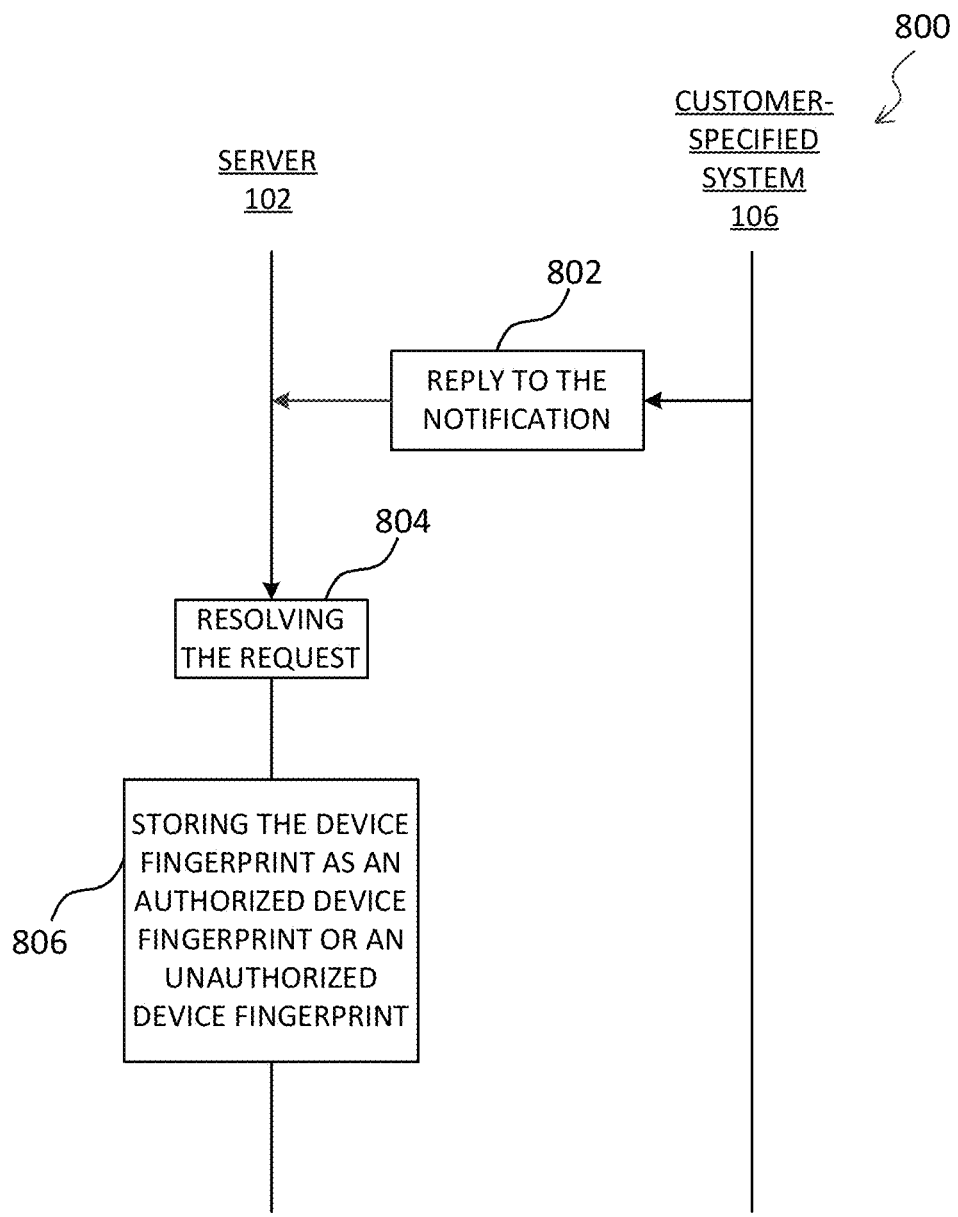
FIG. 8 is a transactional flow diagram illustrating additional steps in which the remote computing device requests remote access to the customer account information through the server according to an embodiment of the present invention.

In an embodiment, a transaction flow diagram 800 as shown in FIG. 8 illustrates additional steps to the transactional flow diagram 700 (FIG. 7), in which the remote computing device 104 requests remote access to customer account information through the server 102 in accordance with the present invention. In step 802, the customer-specified system 106 transmits a reply to the notification. The realization of the notification and reply may be facilitated by means of a user interface at the customer-specified system designed in accordance with known techniques.

The content of reply 802 from the customer-specified system 106 may include an approval or disapproval to the server 102. That is, the customer-specified system 106 can approve the request for remote access to the customer account information, or disapprove the request for remote access to the customer account information. Thus, the customer can approve or disapprove the request for remote access by the unknown laptop. For example, if the customer knows that she or someone she wishes to access the bank account information is the one using the unknown laptop, she can approve the request. Otherwise, she can disapprove the request. In an embodiment, the reply 802 can also include the device fingerprint of the customer-specified system 106 for use by server 102 to authenticate the reply.

In step 804, the server 102 can resolve the request. The server 102 can resolve the request, for example by approving or disapproving the request based on the reply received from the customer-specified system 106. For example, based on the customer's answer, the server 102 can approve or disapprove the request by the unknown laptop for remote access to the bank account information. Optionally, the server 102 can also determine whether the reply to the notification is a valid or invalid reply based on the device fingerprint 516 of the customer-specified system 106 transmitted in the reply. If the device fingerprint 516 of the customer-specified system 106 does not match an administrator fingerprint or matches an unauthorized device fingerprint, the server 102 can treat the reply to the notification as an invalid reply. Thus, the server 102 will not approve or disapprove the request based on the invalid reply. Otherwise, the server 102, if the device fingerprint of the customer-specified system 106 matches an administrator fingerprint, the server 102 can treat the reply to the notification as a valid reply. Thus, the server 102 can approve or disapprove the request based on the reply to the notification.

In step 806, the server 102 stores the device fingerprint 316 as an authorized device fingerprint or an unauthorized device fingerprint. For example, if the reply indicated that the request was approved, then the server 102 can store the device fingerprint 316 of the remote computing device 104 as an authorized device fingerprint. However, if the reply indicated that the request was disapproved, then the server 102 can store the device fingerprint 316 of the remote computing device 104 as an unauthorized device fingerprint. In an embodiment, the server 102 can store such information in the memory 204 (FIG. 2) and/or the database 108 (FIG. 1). Thus, if the customer approves a request, via an administrator fingerprint, of a device fingerprint 316 previously stored as an unauthorized fingerprint, the server 102 can upgrade the device fingerprint 316 as a newly authorized device fingerprint.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for authorizing a request for remote access to customer account information, comprising:
    a server configured to receive the request via a network from a remote computing device; a database storing the customer account information accessible by the server; and
    memory accessible by the server and storing a customer notification program which, when executed by the server, performs steps for
        (a) identifying, responsive to the server receiving the request, the remote computing device fingerprint and by a requesting location;
        (b) determining whether the device fingerprint matches any of a number of device fingerprints previously authorized to access the customer account information;
        (c) sending, responsive to determining a mismatch between the device fingerprint and each of the previously authorized device fingerprints, a notification of the request to an address of a separate device specified by the customer, the notification indicating (i) the request, (ii) identity of the remote computing device, and (iii) the requesting location;
        (d) resolving the request responsive to a reply to the notification; and
        (e) if resolving the request responsive to a reply to the notification results in permitting authorized access to the customer account information by the remote computing device, storing the device fingerprint as a previously authorized device fingerprint and associating the device fingerprint with the customer account information.

2. The system of claim 1 wherein the reply is received from the address of the separate device specified by the customer.

3. The system of claim 1 wherein the notification further interrogates for an answer approving or disapproving the request, and wherein the resolving step further comprises approving or disapproving the request according to the answer.

4. The system of claim 3 further comprising storing, responsive to approving the request, the device fingerprint as a previously authorized device fingerprint.

5. The system of claim 3 further comprising storing, responsive to disapproving the request, the device fingerprint as an unauthorized device fingerprint.

6. The system of claim 3 wherein the notification program interrogates by effecting display of selectable answers on a user interface.

7. The system of claim 1 wherein the identifying step further comprises interrogating the remote computing device for user-configurable device parameters, and generating the device fingerprint using multiple user-configurable device parameters.

8. The system of claim 7 wherein the generated device fingerprint is unlike any other device fingerprint generatable responsive to a request to the server from another remote computing device.

9. The system of claim 1 wherein the number of device fingerprints are stored in a second database accessible by the server.

10. The system of claim 1 wherein the determining step further comprises determining whether the device fingerprint matches any of a number of unauthorized device fingerprints corresponding to a remote computing device previously disapproved from accessing the customer account information, and if a match to such unauthorized device fingerprint is determined, bypassing the sending step and disapproving the request.

11. The system of claim 1 wherein the device fingerprints previously authorized to access the customer account information consist of all device fingerprints having accessed the customer account information via the network within a predetermined time period prior to the request.

12. The system of claim 1 wherein the requesting location comprises a geographic location.

13. The system of claim 1 wherein the identity of the remote computing device includes information selected from the group consisting of manufacturer name, model name, and device type.

14. The system of claim 1 wherein the notification further indicates a time of the request.

15. A system for authorizing a request for remote access to customer account information, comprising:
a server configured to receive the request via a network from a remote computing device;
a database storing the customer account information accessible by the server; and
memory accessible by the server and storing a customer notification program which, when executed by the server, performs steps for
(a) identifying, responsive to the server receiving the request, the remote computing device by a device fingerprint and by a requesting location;
(b) determining whether the device fingerprint matches any of a number of device fingerprints authorized to access the customer account information; and
(c) sending, responsive to determining a mismatch between the device fingerprint and each of the previously authorized device fingerprints, a notification of the request to a customer-specified address, the notification indicating (i) the request, (ii) identity of the remote computing device, and (iii) the requesting location;
wherein the determining step further comprises:
determining based on the device fingerprint whether the remote computing device is a non-mobile computing device;
determining whether the requesting location is an abnormal location; and
if the remote computing device is a non-mobile computing device and if the requesting location is an abnormal location, bypassing the sending step and disapproving the request.

16. A system for authorizing a request for remote access to customer account information, comprising:
a server configured to receive the request via a network from a remote computing device;
a database storing the customer account information accessible by the server; and
memory accessible by the server and storing a customer notification program which, when executed by the server, performs steps for
(a) identifying, responsive to the server receiving the request, the remote computing device by a device fingerprint and by a requesting location;
(b) determining whether the device fingerprint matches any of a number of device fingerprints authorized to access the customer account information; and
(c) sending, responsive to determining a mismatch between the device fingerprint and each of the previously authorized device fingerprints, a notification of the request to a customer-specified address, the notification indicating (i) the request, (ii) identity of the remote computing device, and (iii) the requesting location;
wherein the determining step further comprises:
determining based on the device fingerprint whether the remote computing device is a mobile device;
determining whether the requesting location is a preauthorized temporary location specified in the customer account information;
determining whether timing of the request falls within the time limits specified for the temporary location; and
if the remote computing device is a mobile device, if the requesting location matches the preauthorized temporary location, and if the timing of the request falls within the specified time limits, bypassing the sending step and approving the request.

17. The system of claim 1 wherein the address of the separate device specified by the customer is selected from the group consisting of a telephone number and an e-mail address.

18. The system of claim 1 wherein the notification is selected from the group consisting of a voice message, a text message, and a substantially concurrent transmission of voice and text messages.

19. The system of claim 1 wherein the request comprises a monetary transaction.

20. The system of claim 1 wherein the reply to the notification includes a device fingerprint of the customer-specified separate device transmitting the reply to the notification.

21. The system of claim 20 wherein the resolving step includes:
determining whether the reply to the notification is a valid reply or an invalid reply based on the device fingerprint of the customer-specified separate device; and
disregarding the reply to the notification when the reply to the notification is determined to be an invalid reply.

* * * * *